United States Patent [19]

Sorensen

[11] 4,400,341

[45] Aug. 23, 1983

[54] INJECTION MOLDING OF THERMOPLASTICS IN SANDWICH MOLD EMPLOYING DESYNCHRONIZED OPENING, EXTENDED AND CLOSING PERIODS

[75] Inventor: Jens O. Sorensen, Rancho Santa Fe, Calif.

[73] Assignee: Universal Commerce and Finance N.V., Georgetown, Cayman Islands

[21] Appl. No.: 275,408

[22] Filed: Jun. 19, 1981

Related U.S. Application Data

[63] Continuation-in-part of Ser. No. 197,001, Oct. 14, 1980, abandoned.

[51] Int. Cl.³ .............................................. B29F 1/00
[52] U.S. Cl. .............................. 264/328.8; 264/328.9; 264/331.11; 264/334
[58] Field of Search ............. 264/39, 297, 334, 328.8, 264/328.9, 331.11; 425/183, 190

[56] References Cited

U.S. PATENT DOCUMENTS

| | | | |
|---|---|---|---|
| 3,669,601 | 6/1972 | Lainesse | 425/249 |
| 3,707,342 | 12/1972 | Lohman | 425/242 |
| 3,973,892 | 8/1976 | Rees | 425/250 |
| 4,005,964 | 2/1977 | Bishop | 264/328.8 |
| 4,146,600 | 3/1979 | Elly et al. | 264/39 |

*Primary Examiner*—John A. Parrish
*Attorney, Agent, or Firm*—Brown & Martin

[57] ABSTRACT

A method of injection molding a thermoplastic material to produce a product in a sandwich mold comprising at least two ejection ports each having a cooling cavity, and a single runner system for feeding the two cooling cavities, where each ejection port passes through a retracted period and a protracted period which together make up its production cycle, where the retracted period comprises an injection period and a cooling period and where the protracted period comprises an opening period, an extended period or point in time, and a closing period, the method comprising the step of desynchronizing the opening, extended and closing periods of a first ejection port with the respective opening extended and closing periods of a second ejection port.

11 Claims, 47 Drawing Figures

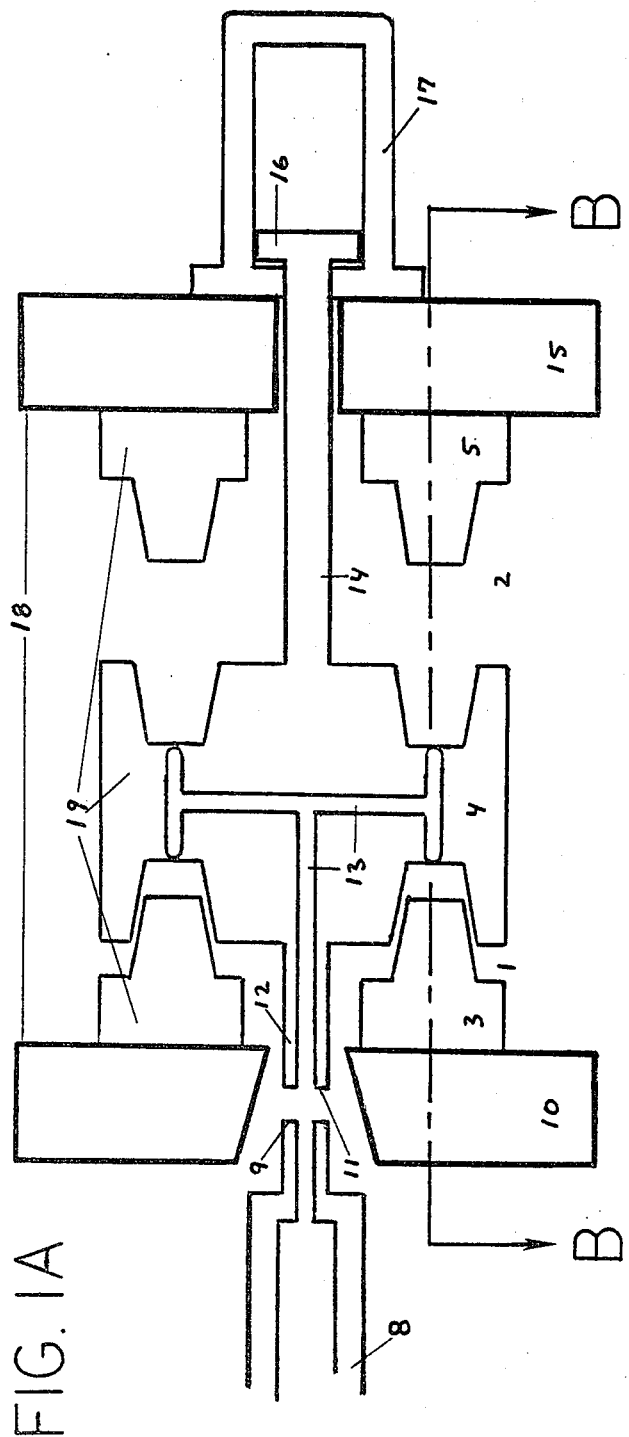
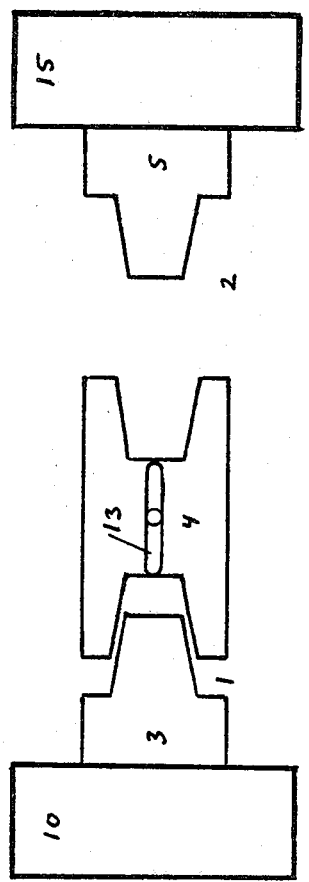
FIG. 1A
FIG. 1B

PRIOR ART

INJECTION MOLDING OF THERMOPLASTICS IN SANDWICH MOLD EMPLOYING DESYNCHRONIZED OPENING, EXTENDED AND CLOSING PERIODS

CROSS REFERENCE TO RELATED APPLICATION

This is a continuation-in-part of my co-pending patent application Ser. No. 06/197,001, filed Oct. 14, 1980, entitled "Production Method in Sandwich Mold Utilizing Desynchronized Opening Periods," now abandoned.

FIELD OF THE INVENTION

This invention generally pertains to a production method employing molds and specifically to injection molding of thermoplastics using a sandwich mold which has more than one ejection port.

Heretofore, injection molding of thermoplastics using a sandwich mold has employed synchronized opening periods of the ejection ports, and has normally utilized a gear system to serve this purpose.

SUMMARY OF THE INVENTION

The present invention is a method of injection molding a thermplastic material in order to produce a product in a sandwich mold comprising at least two ejection ports, each having a cooling cavity, and a single runner system for feeding all the cooling cavities. Each ejection port passes through a retracted period and a protracted period which together make up its production cycle. The retracted period comprises an injection period and a cooling period, and the protracted period comprises an opening period, an extended period or point in time, and a closing period. The method comprises the step of desynchronizing the opening, extended and closing periods of a first ejection port with the respective opening, extended and closing periods of a second ejection port. The first ejection port is defined as the ejection port which begins its opening period first, but when the two ejection ports begin their opening periods simultaneously, the first ejection port means the ejection port which ends it opening period first. For prior art methods with synchronous opening, extended and closing periods, the first ejection port means any random chosen one of the two ejection ports.

The method of the invention provides many unusual and surprising advantages over the prior art thermoplastic injection molding methods in which synchronized opening periods of the ejection ports have been employed. Some of those advantages are as follows:

Advantage number 1. When the injection period of both injection ports are simultaneous and when the opening period of the second ejection port begins subsequent to the beginning of the opening period of the first ejection port, the cooling period of the second ejection port will extend into the opening period of the first ejection port thereby providing more cooling time for the product which is ejected from the second ejection port. This is an advantage in the simultaneous injection molding of products such as containers and ids, where the two products need a different length of time to solidify during their respective cooling periods, so that the product which needs the longer cooling period to solidify may be ejected from the ejection port with the longest cooling period. This advantage occurs in the embodiments illustrated in FIGS. 3, 4, 5, 6, 7, and 8.

Advantage number 2. When the opening period of the second ejection port ends subsequent to the ending of the opening period of the first ejection port, the products which are ejected from the first ejection port are ejected spaced in time from the products which are ejected from the second ejection port. This is an advantage usually in the packing procedure where separation of the ejected products may more easily be accomplished, and provides a more continuous supply of work in the packing procedure. This advantage is also accomplished under the conditions leading to advantage number 1 above and under conditions leading to advantages numbers 3, 4, and 5 below. This advantage occurs in all the illustrated preferred embodiments.

Advantage number 3. When the closing period of the first ejection port begins prior to the ending of the opening period of the second ejection port, the length of the full stroke of the clamping unit is reduced, thereby reducing the size of the required clamping unit. This advantage occurs in the embodiments illustrated in FIGS. 3, 5, 8 and 9.

Advantage number 4. When the closing period of the first ejection port is synchronized with the opening period of the second ejection port only 50% of the length of the prior art stroke of the clamping unit is required. This advantage is also accomplished under the conditions leading to advantage number 5 below. This advantage occurs in the embodiments illustrated in FIGS. 3, 8 and 9.

Advantage number 5. When the injection period of the first ejection port begins subsequent to the ending of the protracted period of the first ejection port, and the injection period of the second ejection port ends prior to the beginning of the protracted period of the first ejection port, it is possible to place the injection periods in separate disjunct periods, whereby the full injection power of the injection unit is available during each injection period. This is of particular importance in the injection molding of products which have a wall thickness of less than 1 mm. This advantage always occurs in the embodiments illustrated in FIG. 9, and may be accomplished in all the other embodiments.

Advantage number 6. Together with all the conditions described above is the advantage of reduced cycle time. Following the description of the preferred embodiments, a calculation of the total production cycle time of each embodiment will be set forth. This advantage occurs in all the illustrated preferred embodiments.

Some of the advantages described above may sometimes occur also under other conditions than the condition described, just as some of the conditions described may sometimes result in other advantages. Further objects and advantages of the invention will become apparent from a consideration of the drawing and ensuring description thereof.

It should be noted that with very few exceptions, any one of the above mentioned advantages does not exclude any other, and that all advantages may be accomplished while employing a sandwich mold which has only one filling orifice.

BRIEF DESCRIPTION OF THE DRAWING

FIG. 1A is a partial top sectional view of an injection molding machine and a sandwich mold assembled in such a manner as to operate in accordance with an embodiment of this invention.

FIG. 1B is a side sectional view of the injection molding machine and the sandwich mold of FIG. 1A taken as indicated by section line B—B.

DESCRIPTION OF THE PREFERRED EMBODIMENTS

Figure 2A:
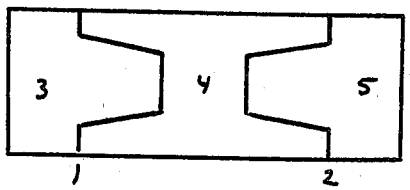
FIGS. 2 through 9 are each a chronological series of partial side sectional views of the sandwich mold of the injection molding machine of FIG. 1B.

FIG. 1 shows a part of a conventional injection unit 8 of an injection molding machine with injection nozzle 9. Also shown is a conventional clamping unit 18 of the injection molding machine comprising a stationary platen 10 and a moveable platen 15. Tie rods are not shown. Also shown is a conventional sandwich mold 19 comprising a front mold part 3, an intermediate mold part 4, and a rear mold part 5. The front mold part 3 is fastened to the stationary platen 10 and the rear mold part 5 is fastened to the moveable platen 15. A first ejection port 1 is positioned between front mold part 3 and intermediate mold part 4, and a second ejection port 2 is positioned between intermediate mold part 4 and rear mold part 5. A runner bushing 12 with a filling orifice 11 extends from the intermediate mold part 4 toward the tip of the injection nozzle 9. The runner bushing 12 and the intermediate mold part 4 contain a runner system 13 of a hot runner or insulated runner type. During an injection period the tip of the injection nozzle 9 forms a seal with the filling orifice 11 of the runner bushing 12.

The sandwich mold 19 does not have a conventional gear system to synchronize the opening period of the first ejection port with the opening period of the second ejection port. Illustrated is a conventional ejector cylinder 17 with a piston 16 which via a piston rod 14 is fastened to the intermediate mold part 4. The ejector cylinder 17 does not serve its conventional purpose of steering an ejection or stripper unit, but is used to steer the intermediate mold part 4 into any position between the front mold part 3 and the rear mold part 5 in order to desynchronize the opening period of the first ejection port 1 with the opening period of the second ejection port 2.

FIGS. 2 through 9 show the sandwich mold 19 of FIG. 1 comprising front mold part 3, intermediate mold part 4 and rear mold part 5. Also illustrated is a first ejection port 1 and a second ejection port 2, and a first ejected product 6 and a second ejected product 7.

FIG. 2 illustrates a prior art production method with synchronized opening, extended and closing periods which operates by passing through the following chronological periods.

FIG. 2A shows the first ejection port 1 and the second ejection port 2 both at the end of their retracted period which comprises the injection period and the cooling period, and both at the beginning of their opening periods.

Figure 2B:
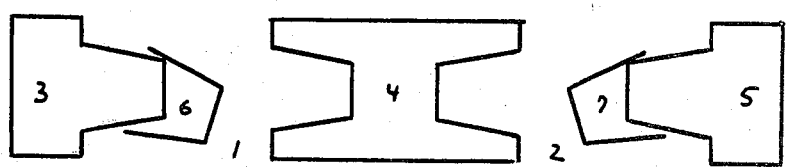

FIG. 2B shows the first ejection port 1 and the second ejection port 2, both at the end of their opening periods and at the beginning of their extended periods. Two produced products 6 and 7 are being ejected. Since both the beginning and the end of the opening periods of both ejection ports 1 and 2 are simultaneous, the opening periods are synchronous.

Figure 2C:
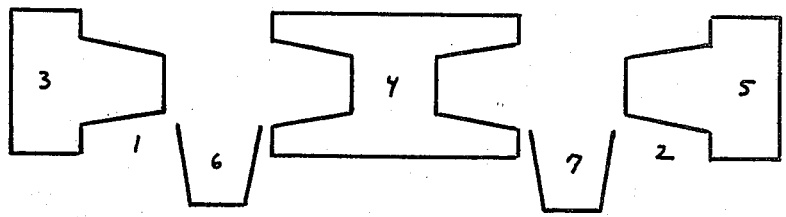

FIG. 2C shows the first ejection port 1 and the second ejection port 2, both at the end of their extended period and at the beginning of their closing period. The two produced products 6 and 7 have been ejected.

Figure 2D:
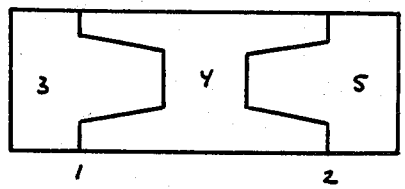

FIG. 2D shows the first ejection port 1 and the second ejection port 2, both at the end of their closing period and at the beginning of their retracted period, which ends the production cycle of both ejection ports.

FIG. 3 illustrates s preferred embodiment of the invention which operates by pasing through the following chronological periods.

Figure 3A:
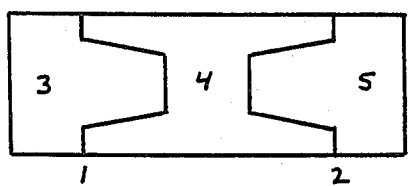

FIG. 3A shows the first ejection port 1 at the end of its retracted period and at the beginning of its opening period and shows the second ejection port 2 at some time during its retracted period.

Figure 3B:
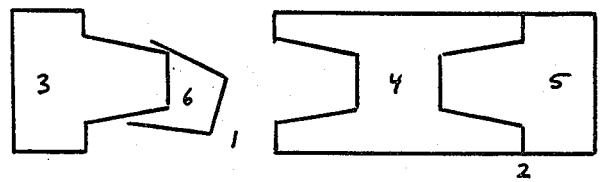

FIG. 3B shows the first ejection port 1 at the end of its opening period and at the beginning of its extended period. A first produced product 6 is being ejected. FIG. 3B also shows the second ejection port 2 at some time during its retracted period.

Figure 3C:
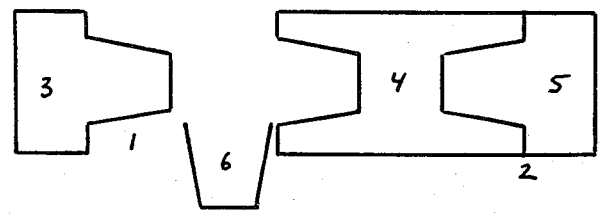

FIG. 3C shows the first ejection port 1 at the end of its extended period and at the beginning of its closing period. The first produced product 6 has been ejected. FIG. 3C also shows the second ejection port at the end of its retracted period and at the beginning of its opening period.

Figure 3D:
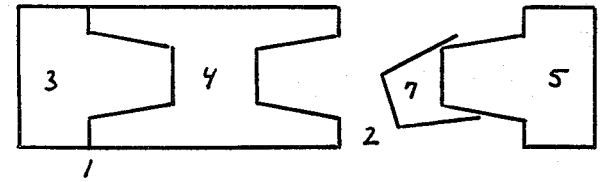

FIG. 3D shows the first ejection port 1 at the end of its closing period and at the beginning of its retracted period, and shows the second ejection port 2 at the end of its opening period and at the beginning of its extended period. A produced second product 7 is being ejected.

Figure 3E:
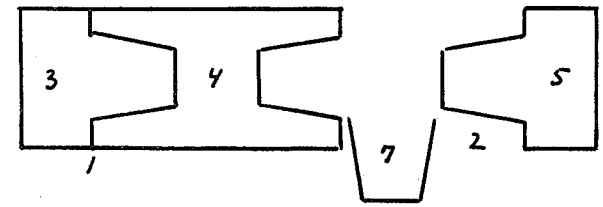

FIG. 3E shows the first ejection port 1 at some time during its retracted period and shows the second ejection port 2 at the end of its extended period and at the beginning of its closing period. The second produced product 7 has been ejected.

Figure 3F:
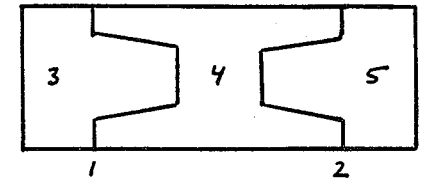

FIG. 3F shows the first ejection port 1 at some time during its retracted period, and shows the second ejection port 2 at the end of its closing period and at the beginning of its retracted period.

Advantages numbers 1, 2, 3, 4 and 6 occur in this embodiment.

FIG. 4 illustrates a preferred embodiment of the invention which operates by passing through the following chronological periods.

Figure 4A:
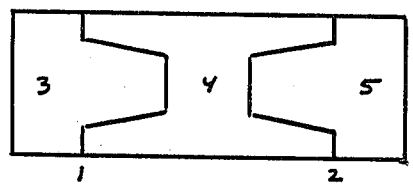

FIG. 4A shows the first ejection port 1 at the end of its retracted period and at the beginning of its opening period, and shows the second ejection port 2 at some time during its retracted period.

Figure 4B:
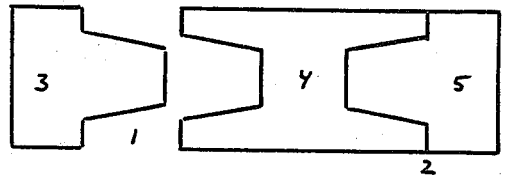

FIG. 4B shows the first ejection port 1 at some time during its opening period and shows the second ejection port at the end of its retracted period and at the beginning of its opening period.

Figure 4C:
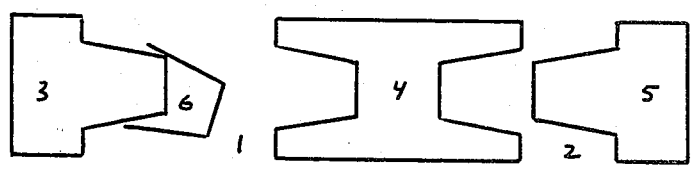

FIG. 4C shows the first ejection port 1 at the end of its opening period and at the beginning of its extended period. A first produced product 6 is being ejected. FIG. 4C also shows the second ejection port 2 at some time during its opening period.

Figure 4D:
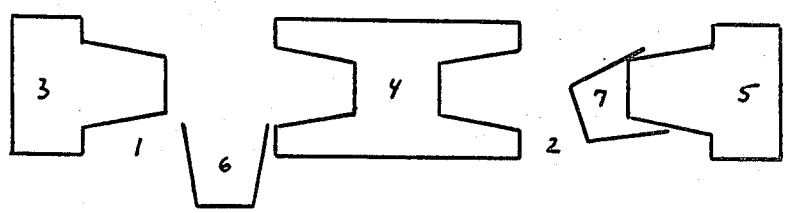

FIG. 4D shows the first ejection port 1 at the end of its extended period and at the beginning of its closing period. The first produced product 6 has been ejected. FIG. 4D also shows the second ejection port 2 at the end of its opening period and at the beginning of its extended period. A second produced product 7 is being ejected.

Figure 4E:
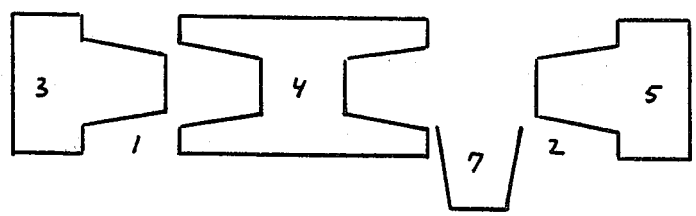

FIG. 4E shows the first ejection port 1 at some time during its closing period and shows the second ejection port 2 at the end of its extended period and at the beginning of its closing period. The second produced product 7 has been ejected.

Figure 4F:
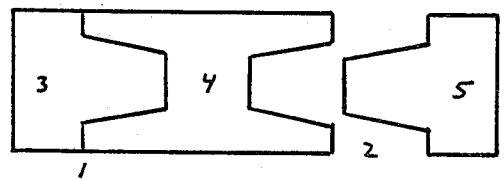

FIG. 4F shows the first ejection port 1 at the end of its closing period and at the beginning of its retracted period, and shows the second ejection port 2 at some time during its closing period.

Figure 4G:
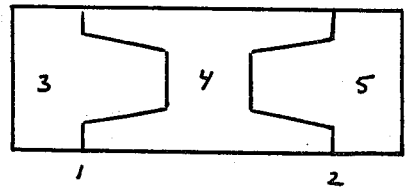

FIG. 4G shows the first ejection port 1 at some time during its retracted period and shows the second ejection port at the end of its closing period and at the beginning of its retracted period.

Advantages number 1, 2, and 6 occur in this embodiment.

FIG. 5 illustrates a preferred embodiment of the invention which operates by passing through the following chronological periods.

Figure 5A:
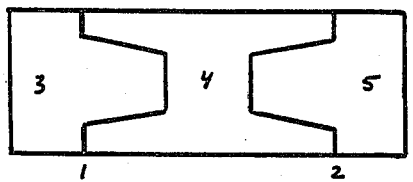

FIG. 5A shows the first ejection port 1 at the end of its retracted period and at the beginning of its opening period, and shows the second ejection port 2 at some time during its retracted period.

Figure 5B:
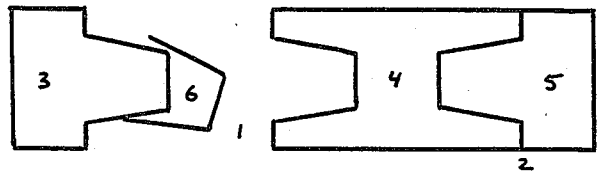

FIG. 5B shows the first ejection port 1 at the end of its opening period and at the beginning of its extended period. A first produced product 6 is being ejected. FIG. 5B also shows the second ejection port 2 at the end of its retracted period and at the beginning of its opening period.

Figure 5C:
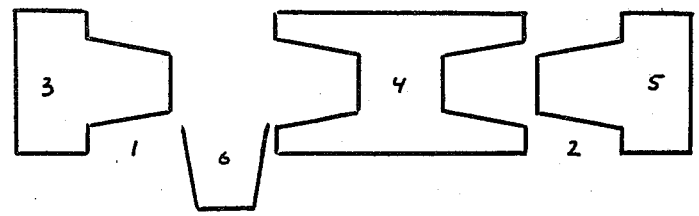

FIG. 5C shows the first ejection port 1 at the end of its extended period and at the beginning of its closing period. The first produced product 6 has been ejected. FIG. 5C also shows the second ejection port 2 at some time during its opening period.

Figure 5D:
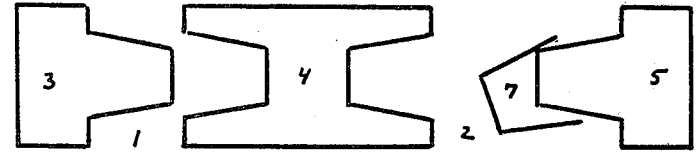

FIG. 5D shows the first ejection port 1 at some time during its closing period and shows the second ejection port 2 at the end of its opening period and at the beginning of its extended period. A second produced product 7 is being ejected.

Figure 5E:
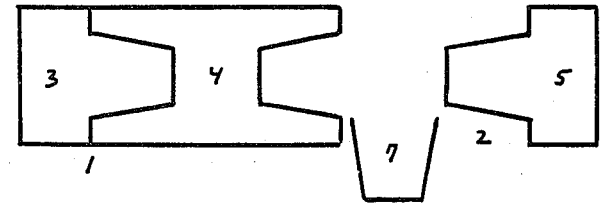

FIG. 5E shows the first ejection port 1 at the end of its closing period and at the beginning of its retracted period, and shows the second ejection port 2 at the end of its extended period and at the beginning of its closing period. The second produced product 7 has been ejected.

Figure 5F:
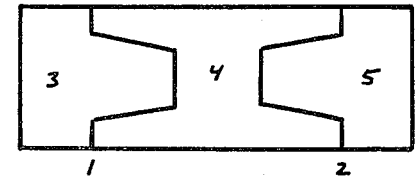

FIG. 5F shows the first ejection port 1 at some time during its retracted period, and shows the second ejection port 2 at the end of its closing period and at the beginning of its retracted period.

Advantages number 1, 2, 3, and 6 occur in this embodiment.

FIG. 6 illustrates a preferred embodiment of the invention which operates by passing through the following chronological periods.

Figure 6A:
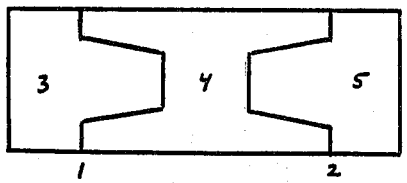

FIG. 6A shows the first ejection port 1 at the end of its retracted period and at the beginning of its opening period, and shows the second ejection port 2 at some time during its retracted period.

Figure 6B:
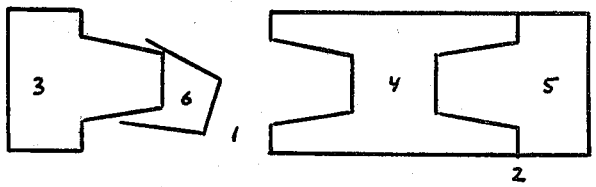

FIG. 6B shows the first ejection port 1 at the end of its opening period and at the beginning of its extended period. A first produced product 6 is being ejected. FIG. 6B also shows the second ejection port 2 at the end of its retracted period and at the beginning of its opening period.

Figure 6C:
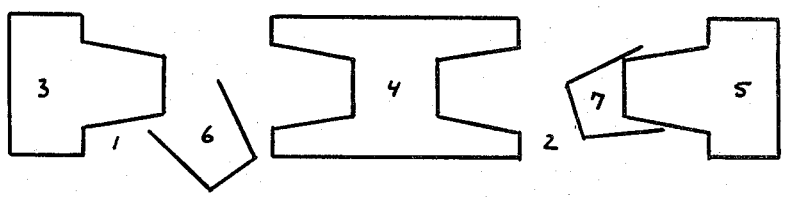

FIG. 6C shows the first ejection port 1 at some time during its extended period. The first produced product 6 is still being ejected. FIG. 6C also shows the second ejection port 2 at the end of its opening period and at the beginning of its extended period. A second produced product 7 is being ejected.

Figure 6D:
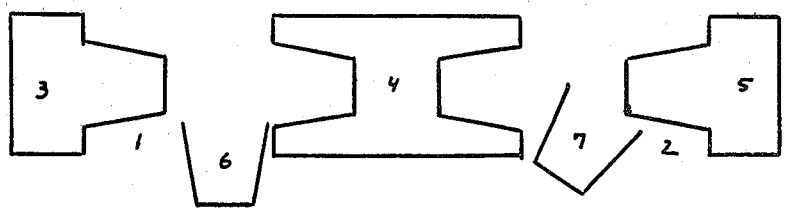

FIG. 6D shows the first ejection port 1 at the end of its extended period and at the beginning of its closing period. The first produced product 6 has been ejected. FIG. 6D also shows the second ejection port 2 at some time during its extended period. The second produced product 7 is still being ejected.

Figure 6E:
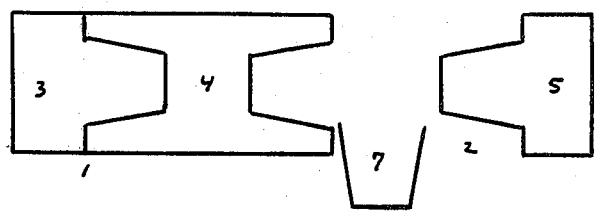

FIG. 6E shows the first ejection port 1 at the end of its closing period and at the beginning of its retracted period, and also shows the second ejection port 2 at the end of its extended period and at the beginning of its closing period. The second produced product 7 has been ejected.

Figure 6F:
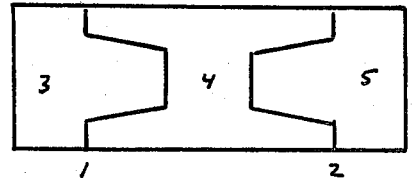

FIG. 6F shows the first ejection port 1 at some time during its retracted period and also shows the second ejection port 2 at the end of its closing period and at the beginning of its retracted period.

Advantages numbers 1, 2, and 6 occur in this embodiment.

FIG. 7 illustrates a preferred embodiment of the invention which operates by passing through the following chronological periods.

Figure 7A:
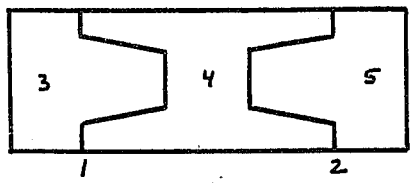

FIG. 7A shows the first ejection port 1 at the end of its retracted period and at the beginning of its opening period, and shows the second ejection port 2 at some time during its retracted period.

Figure 7B:
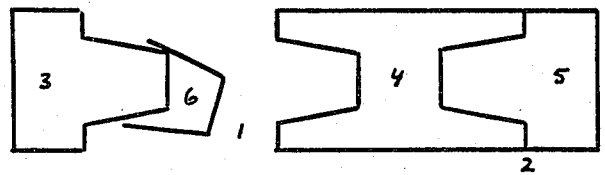

FIG. 7B shows the first ejection port 1 at the end of its opening period and at the beginning of its extended period. A first produced product 6 is being ejected. FIG. 7A also shows the second ejection port 2 at the end of its retracted period and at the beginning of its opening period.

Figure 7C:
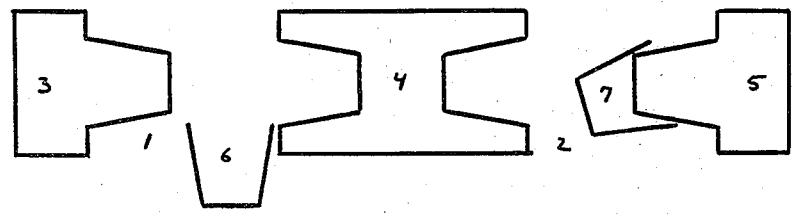

FIG. 7C shows the first ejection port 1 at the end of its extended period and at the beginning of its closing period. The first produced product 6 has been ejected. FIG. 7C also shows the second ejection port 2 at the end of its closing period and at the beginning of its extended period. A second produced product 7 is being ejected.

Figure 7D:
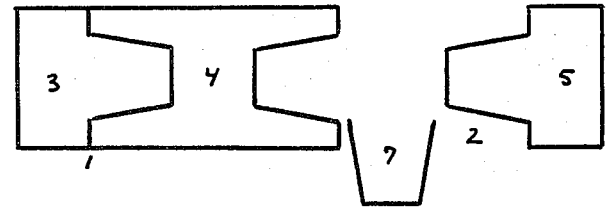

FIG. 7D shows the first ejection port 1 at the end of its closing period and at the beginning of its retracted period, and shows the second ejection port 2 at the end of its extended period and at the beginning of its closing period. The second produced product 7 has been ejected.

Figure 7E:
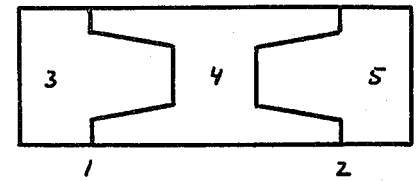

FIG. 7E shows the first ejection port 1 at some time during its retracted period and shows the second ejection port 2 at the end of its closing period and the beginning of its retracted period.

Advantages numbers 1, 2, and 6 occur in this embodiment.

FIG. 8 illustrates a preferred embodiment of the invention which operates by passing through the following chronological periods.

Figure 8A:
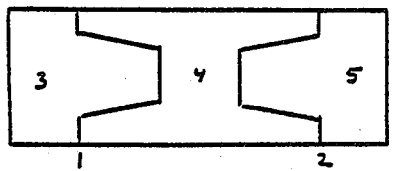

FIG. 8A shows the first ejection port 1 at the end of its retracted period and at the beginning of its opening period, and shows the second ejection port 2 at some time during its retracted period.

Figure 8B:
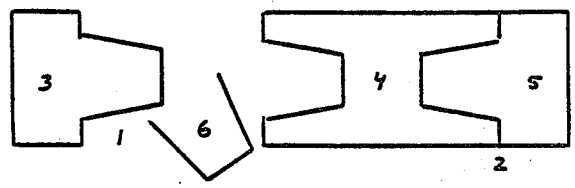

FIG. 8B shows the first ejection port 1 at the end of its opening period, at its extended point, and at the beginning of its closing period. The first produced product 6 has almost been ejected, and there is no need for any extended period for a very fast ejection.

Figure 8C:
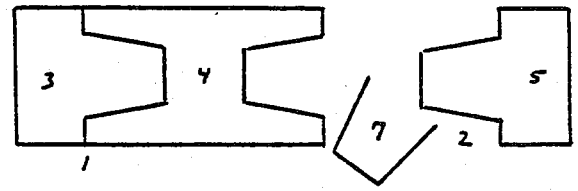

FIG. 8C shows the first ejection port 1 at the end of its closing period and at the beginning of its retracted period, and shows the second ejection port 2 at the end of its opening period, at its extended point and at the beginning of its closing period. A second produced product 7 has almost been ejected, and there is no need for any extended period for a very fast ejection.

Figure 8D:
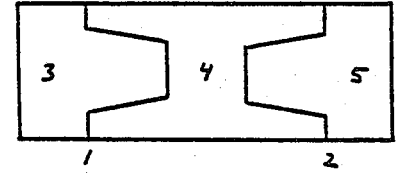

FIG. 8D shows the first ejection port 1 some time during its retracted period and shows the second ejection port at the end of its closing period and at the beginning of its retracted period.

Advantages numbers 1, 2, 3, 4, and 6 occur in this embodiment. Neither ejection port 1 nor 2 passes through any extended period but only through an extended point in time because the produced products 1 and 2 were able to be ejected between the opening period and the closing period.

FIG. 9 illustrates a preferred embodiment of the invention which operates by passing through the following chronological periods.

Figure 9A:
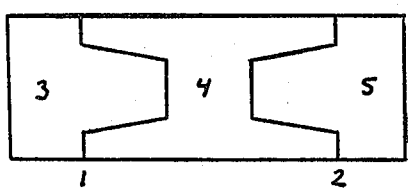

FIG. 9A shows the first ejection port 1 at the end of its cooling period and at the beginning of its opening period, and shows the second ejection port 2 during its injection period and during the beginning of its cooling period.

Figure 9B:
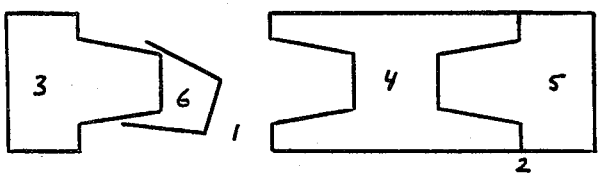

FIG. 9B shows the first ejection port 1 at the end of its opening period and at the beginning of its extended period. A first produced product 6 is being ejected. FIG. 9B also shows the second ejection port 2 at some time during its cooling period.

Figure 9C:
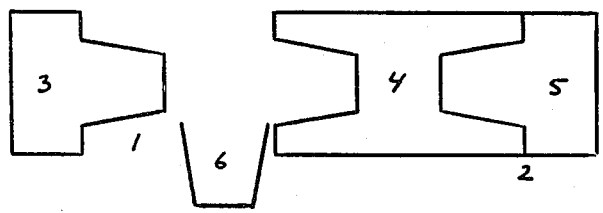

FIG. 9C shows the first ejection port at the end of its extended period and at the beginning of its closing period. The first produced product 6 has been ejected. FIG. 9C also shows the second ejection port at some time during its cooling period.

Figure 9D:
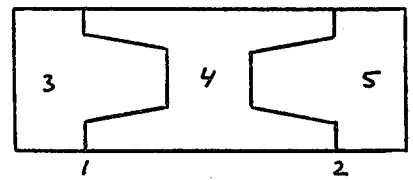

FIG. 9D shows the first ejection port 1 at the end of its cooling period and during its injection period and during the beginning of its cooling period and shows the second ejection port at the end of its cooling period and at the beginning of its opening period.

Figure 9E:
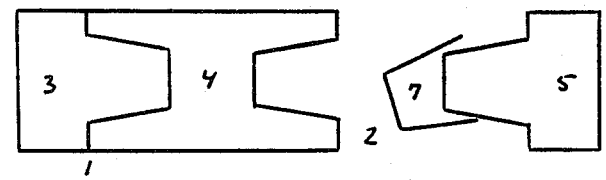

FIG. 9E shows the first ejection port 1 at some time during its cooling period and shows the second ejection port at the end of its opening period and at the beginning of its extended period. A second produced product 7 is being ejected.

Figure 9F:
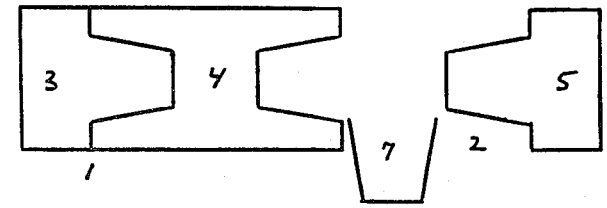

FIG. 9F shows the first ejection port 1 at some time during its cooling period and shows the second ejection port 2 at the end of its extended period and the beginning of its closing period. The produced product 7 has been ejected.

Figure 9G:
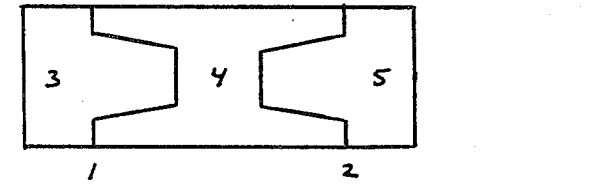

FIG. 9G shows the first ejection port 1 at some time during its cooling period and shows the second ejection port 2 at the end of its closing period and at the beginning of its injection period.

Advantages numbers 2, 3, 4, 5 and 6 occur in this embodiment.

In the embodiment of FIG. 9 it is possible to leave out FIGS. 9C and 9F in case the produced products 1 and 2 are able to be ejected without requiring a extended period but at only an extended point in time between the opening period and the closing period.

In all the preferred embodiments 3 through 9 the ejection port which is nearest to the stationary mold platen has been the ejection port which opens first during the total production cycle. Embodiments where the other ejection port opens first are equally possible. Many other embodiments are possible, for example, combinations of parts of the illustrated embodiments. One interesting embodiment is one where the extended period or point in time of the first ejection port takes place within the opening period of the second ejection port and the extended period or point in time of the second ejection port takes place within the closing period of the first ejection port.

Without narrowing the scope of the invention, and only for the purpose of calculating an approximate length of the total production cycle of each method as illustrated in FIGS. 3 to 9, we may make the following assumptions:

(a) That the rear mold part 5 moves back and forth with a certain speed V in relation to the front mold part 3.

(b) That the intermediate mold part 4 moves back and forth with a maximum speed equal to V in relation to the rear mold part 5.

(c) That the opening distance D is the same for all ejection ports.

(d) That the time T is the time taken to move distance D at speed V.

(e) That the extended period is E. This period is usually very short and is typically in the order of 0 to 1 second.

(f) That the injection period is I.

(g) That the cooling period is C.

The duration of the total production period of the prior art method illustrated in FIG. 2 is then:

$$I+C+4T+E$$

The duration of the total production period of the embodiment illustrated in FIG. 3 is:

$$I+C+3T+2E$$

So this embodiment has a shorter total production period than the prior art when E is shorter than T which is most commonly the case.

The embodiment illustrated in FIG. 4 always has T being longer than E. The duration of the total production period is:

$$I+C+4T$$

This is a shorter total prouction period than in the prior art method of FIG. 2. It is also a faster method than that of FIG. 4 when E is shorter than T and T is shorter than 2E, but slower when 2E is shorter than T.

The embodiment illustrated in FIG. 5 also always has T longer than E. The duration of the total production period is:

$$I+C+3T+E$$

Since T is longer than E, this is a faster method than any of the previously described methods of FIGS. 2, 3, and 4.

The embodiment illustrated in FIG. 6 always has T shorter than E. The duration of the total production period is:

$$I+C+3T+E$$

This is a faster method than the prior art method of FIG. 2 and faster than the method of FIG. 3. This method cannot be compared to the methods of FIGS. 4 and 5 since T is shorter than E.

The embodiment illustrated in FIG. 7 has T=E. The duration of the total production period is:

$$I+C+4T$$

This is a faster method than the prior art method of FIG. 2 and than the method of FIG. 3.

The embodiment illustrated in FIG. 8 has E=0. The duration of the total production period is:

$$I+C+3T$$

This is faster than the prior art method of FIG. 2, and is the same method as illustrated in FIG. 3 when the extended periods are reduced to extended points in time.

The embodiment illustrated in FIG. 9 has a total production period of:

$$I+C+2T+E$$

This method is the fastest of all the methods described in FIGS. 2 through 9. But this method is limited to conditions where C is longer than or equal to $I+2T+E$. Since the method is faster than all the other methods at least by a period of T, it will still be as fast as the fastest method if the cooling period can be artificially increased up to $C+T$. When the cooling period can be increased by T, then the method is the fastest method even when C is longer than or equal to $I+T+E$.

So far advantage number 1 has not been taken into account. When the product which is ejected from the one ejection port needs a shorter cooling period than the product ejected from the other ejection port, there may be a saving in the total production period in most of the embodiments. The maximum theoretical saving in each embodiment is as follows:

FIG. 3—$T+E$
FIG. 4—less than T
FIG. 5—T
FIG. 6—T
FIG. 7—T
FIG. 8—T

C is the cooling period for the longest cooling product.

While the above described embodiments contain many specific features, these should not be construed as limitations of the scope of the invention but rather as an exemplification of the preferred embodiments. Many other variations are possible. For example, methods utilizing a sandwich mold with more than two ejection ports and methods wherein the steering of the intermediate mold part is steered in relation to the front mold part and/or the rear mold part by employing other means that the hydraulic ejector cylinder as shown in FIG. 1A. The individual injection periods, opening periods, extended periods or points in time, and closing periods of the different ejection ports may vary from those of the other ejection ports and a total production cycle may be constructed to optimize the various obtainable advantages. Accordingly, the scope of the invention should be determined not by the embodiments illustrated, but by the appended claims and their legal equivalents.

I claim:

1. A method of injection molding a thermoplastic material to produce a product in a sandwich mold comprising at least two ejection ports, each having a cooling cavity and a single runner system for feeding the two cooling cavities, wherein each ejection port passes through a retracted period and a protracted period which together make up its production cycle, wherein the retracted period comprises an injection period and a coolng period, wherein the protracted period comprises an opening period, an extended period or point in time, and a closing period, wherein the retracted periods for the two ejection ports overlap, and wherein the injection periods for both of the two ejection ports occur during each overlapping period, the method being characterized by the step of:

(a) desynchronizing the opening, extended and closing periods of a first ejection port with the respective opening, extended and closing periods of a second ejection port.

2. A method according to claim 1, wherein step (a) comprises the step of:
(b) beginning the opening period of the second ejection port subsequent to beginning the opening period of the first ejection port.

3. A method according to claim 1, comprising the additional step of:
(b) beginning the closing period of the first ejection port prior to ending the opening period of the second ejection port.

4. A method according to claim 1, wherein step (a) comprises the step of:
(b) ending the opening period of the second ejection port subsequent to ending the opening period of the first ejection port.

5. A method according to claim 1, comprising the additional step of:
(b) beginning the opening period of the second ejection port not later than beginning the closing period of the first ejection port.

6. A method according to claim 5, wherein step (b) comprises the step of:
(c) beginning the opening period of the second ejection port not later than at the end of the opening period of the first ejection port
and the method comprises the additional step of:
(d) beginning the closing period of the second ejection port not later than at the end of the closing period of the first ejection port.

7. A method according to claim 6, wherein step (c) comprises the step of:
(e) beginning the opening period of the second ejection port before the end of the opening period of the first ejection port
and wherein step (d) comprises the step of
(f) beginning the closing period of the second ejection port before the end of the closing period of the first ejection port.

8. A method according to claim 5, wherein step (b) comprises the step of:
(c) synchronizing the closing period of the first ejection port with the opening period of the second ejection port.

9. A method according to claim 1, comprising the additional step of:
(b) ending the injection period of both the first ejection port and the second ejection port prior to beginning the protracted period of the first ejection port.

10. A method according to claim 1, further comprising the step of:
(b) separating the injection period of the first ejection port from the injection period of the second ejection port.

11. A method of injection molding a thermoplastic material to produce a product in a sandwich mold that includes at least two ejection ports, each having a cooling cavity, and a single runner system for feeding the two cooling cavities, wherein each ejection port passes through a retracted period and a protracted period which together make up its production cycle, wherein the retracted period includes an injection period and a cooling period, and wherein the protracted period includes an opening period, an extended period or point in time, and a closing period, the method being characterized by the steps of:
  (a) desynchronizing the opening, extended and closing periods of a first ejection port with the respective opening, extended and closing periods of a second ejection port;
  (b) beginning the injection period of the first ejection port subsequent to ending the protracted period of the first ejection port;
  (c) ending the injection period of the first ejection port prior to beginning the protracted period of the second ejection port;
  (d) beginning the injection period of the second ejection port subsequent to ending the protracted period of the second ejection port; and
  (e) ending the injection period of the second ejection port prior to beginning the protracted period of the first ejection port for the following cycle.

* * * * *